United States Patent
Deck

(10) Patent No.: US 10,404,477 B1
(45) Date of Patent: Sep. 3, 2019

(54) SYNCHRONIZATION OF PERSONAL DIGITAL CERTIFICATES

(71) Applicant: Amazon Technologies, Inc., Seattle, WA (US)

(72) Inventor: Michael Bannon Deck, Dallas, TX (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 15/054,013

(22) Filed: Feb. 25, 2016

(51) Int. Cl.
*H04L 9/00* (2006.01)
*H04L 9/32* (2006.01)

(52) U.S. Cl.
CPC .................................. *H04L 9/3268* (2013.01)

(58) Field of Classification Search
CPC ..................................................... H04L 9/3268
See application file for complete search history.

(56) References Cited

U.S. PATENT DOCUMENTS

| | | | | |
|---|---|---|---|---|
| 2001/0034834 A1* | 10/2001 | Matsuyama | .......... | H04L 9/3268 713/156 |
| 2014/0006788 A1* | 1/2014 | Ignatchenko | ....... | H04L 63/0428 713/175 |
| 2017/0041151 A1* | 2/2017 | Kommireddy | .......... | H04L 9/006 |

* cited by examiner

*Primary Examiner* — Alexander Lagor
*Assistant Examiner* — Syed M Ahsan
(74) *Attorney, Agent, or Firm* — Davis Wright Tremaine LLP

(57) ABSTRACT

A root user device associated with a user receives a request from a non-root user device associated with the user to issue a digital certificate to the non-root user device. The root user device utilizes a shared secret to determine whether the request is valid. If the request is determined to be valid, the root user device uses a public cryptographic key of a cryptographic key pair generated by the non-root user device to generate the digital certificate. The root user device digitally signs the digital certificate by using its private cryptographic key of a cryptographic key pair generated by the root user device. The root user device issues the digitally signed digital certificate to the non-root user device for use in authentication of the non-root user device.

20 Claims, 10 Drawing Sheets

US 10,404,477 B1

SYNCHRONIZATION OF PERSONAL DIGITAL CERTIFICATES

BACKGROUND

Individuals and other entities often rely on authentication systems based on a public key infrastructure (PKI) to significantly mitigate or otherwise mitigate a number of security risks that may be posed through use of passwords or other sensitive information over a communications network, such as the Internet. However, for some entities, there are difficulties that may prevent these entities from adopting such authentication systems. For instance, if an individual owns a variety of user devices, it may be difficult to synchronize digital certificates across these devices. Further, unlike passwords that can be set to something easily remembered by an individual, digital certificates are not human readable or memorable. While password synchronization tools are available for PKI keys, these tools are also subject to their own vulnerabilities.

BRIEF DESCRIPTION OF THE DRAWINGS

Various techniques will be described with reference to the drawings, in which.

DETAILED DESCRIPTION

Figure 1:
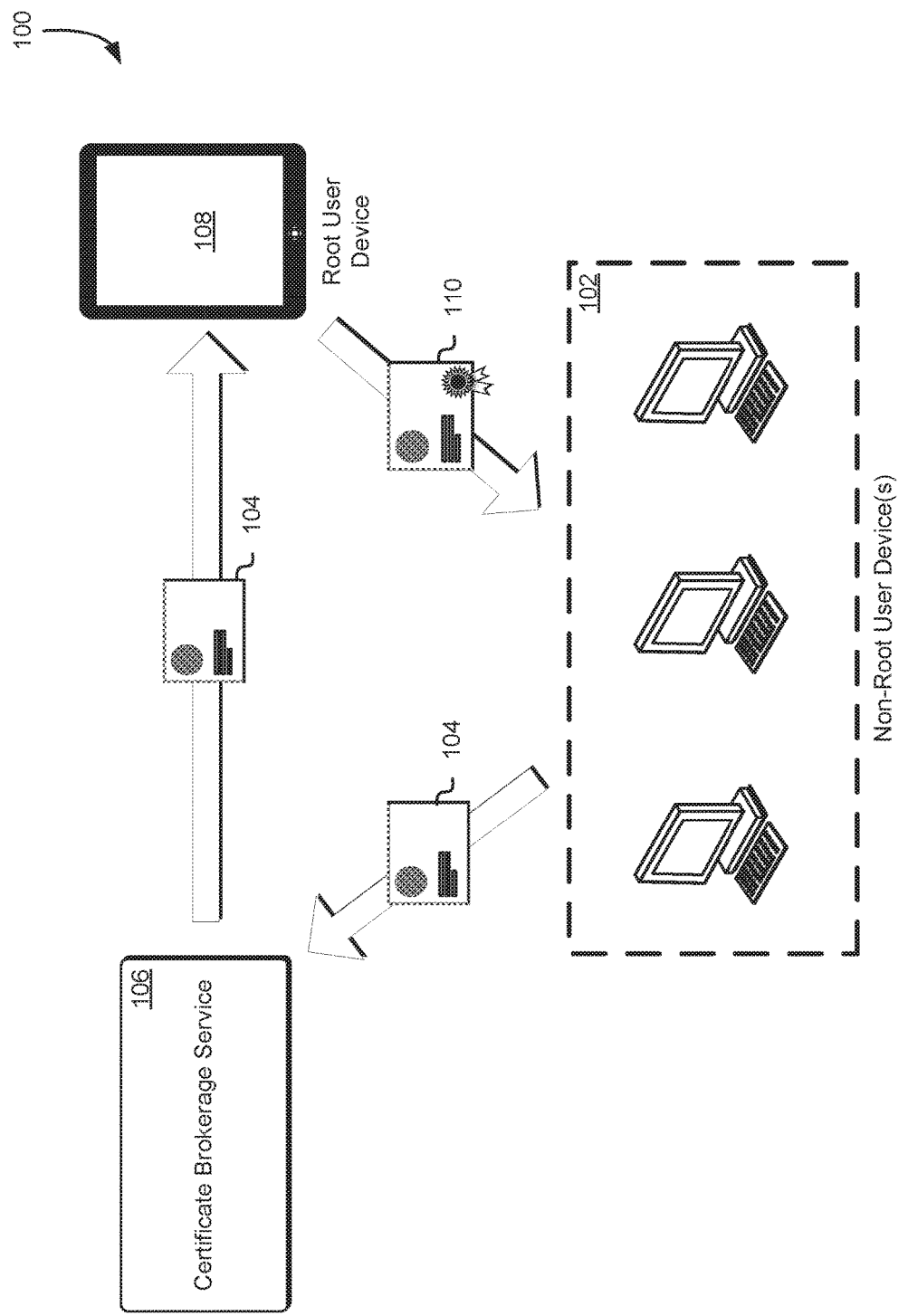
FIG. 1 shows an illustrative example of an environment in which digital certificates are issued to different user devices through a root user device utilized as a certificate authority for the digital certificates in accordance with at least one embodiment.

This disclosure relates to the synchronization of a user's identity across the user's various computing devices through creation of device-specific cryptographic key pairs and digital certificates and having these digital certificates signed by the user's own private certificate authority. In an illustrative example, a user transmits a request to a certificate brokerage service to create a user account that is used to register a root user device that is used as a personal certificate authority for issuing digital certificates to other non-root user devices. Through the root user device, the user may create a device-specific cryptographic key pair and certificate authority artifacts that may serve as a manifestation of the user's identity. This cryptographic key pair stored on the root user device can be encrypted or secured through various mechanisms to prevent other users from accessing the cryptographic key pair. The root user device may transmit a notification to the certificate brokerage service to indicate that it is to serve as the certificate authority for the user's account. The notification may further include the root user device's public cryptographic key and the certificate authority artifacts, which may be stored within the user's account. In response to the notification, the certificate brokerage service may store metadata about the user and the root user device that is assigned to serve as the certificate authority for various purposes. For instance, the certificate brokerage service may utilize the metadata associated with the user and the root user device to identify the root user device and transmit requests on behalf of various non-root user devices to the root user device associated with the user's account.

In some examples, if a user obtains a non-root user device, the user can generate, through the non-root user device, a request to obtain a new digital certificate for the non-root user device that can be used by third-party services to authenticate the user and the non-root user device. In response to the request, the non-root user device generates a local cryptographic key pair that can be used for authenticating the user. Additionally, through the non-root user device, the user may generate verification data that may be used by the user to verify that the request to obtain a digital certificate for the non-root user device originated from the user. The non-root user device may utilize a shared secret to encrypt this verification data and generate a digital certificate signing request that can be transmitted to the root user device. The non-root user device may include the user's account information associated with its certificate brokerage service account in the request to enable the certificate brokerage service to access the user's account and determine the non-root user device assigned to operate as the user's personal certificate authority, as specified in the user's account. In some examples, the request may further include a public cryptographic key of the local cryptographic key pair. This public cryptographic key may be stored by the root user device to process any later digitally signed requests from the non-root user device (e.g., renewal of a digital certificate, cryptographic key rotation, etc.).

The certificate brokerage service may transmit the digital certificate signing request from the non-root user device to the root user device specified in the user's account. In an example, the root user device obtains the request from the certificate brokerage service and utilizes the shared secret common to the non-root user device and the root user device to decrypt the verification data included in the request. The root user device may present the verification data to the user to enable the user to evaluate the verification data and determine whether the received request is valid. For instance, the root user device may present the decrypted verification data to the user to enable the user to confirm that the verification data was generated by the user through the non-root user device. If the user determines that the received request is valid and indicates, through the root user device, that the request is valid, the root user device may issue a digital certificate to the non-root user device that can be used for authentication of the user on various third-party services.

In some examples, the non-root user device can transmit a digitally signed request and the digital certificate to a third-party service to perform various operations on the service. In response to the request, the third-party service determines whether the root user's device public cryptographic key can be trusted for authentication purposes. If the third-party service determines that this public cryptographic key can be trusted, the third-party service may utilize the key to determine whether the digital certificate obtained from the non-root user device can be trusted. If so, the third-party service may use the non-root user device's public cryptographic key included in the digital certificate to verify the digital signature specified in the request. If the third-party service determines that the digital signature is valid, the third-party service may successfully authenticate the non-root user device and fulfill the incoming request.

In this manner, a user can utilize a root user device as a personal certificate authority to synchronize its identity across any number of non-root user devices, such that the non-root user devices can be authenticated by various third-party services through use of digital certificates issued by the root user device. In addition, the techniques described and suggested in this disclosure enable additional technical advantages. For instance, because the root user device stores the public cryptographic key of a non-root user device's cryptographic key pair, the root user device may process later requests to generate a new digital certificate for the non-root user device. As an illustrative example, the non-root user device can generate a new digital certificate signing request for a new digital certificate should it detect the upcoming expiration of the existing digital certificate. The request can be digitally signed using the old private cryptographic key. Further, the request can include the new public cryptographic key generated by the non-root user device that can be included in the new digital certificate. Thus, the root user device can use the old public cryptographic key to authenticate the request and use the new public cryptographic key to generate a new digital certificate for the non-root user device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which digital certificates 110 are issued to different non-root user devices 102 by a root user device 108 utilized as a certificate authority for the digital certificates in accordance with at least one embodiment. In the environment 100, a non-root user device 102 generates a digital certificate signing request 104 to obtain a digital certificate 110 that may be presented to third-party services to enable authentication of the non-root user device 102. A non-root user device 102 may include a desktop computer, a tablet computer, a laptop computer, smartphone, smartwatch, or any other computing device. The non-root user device 102 may have installed on the device one or more applications that may be used to register the device with one or more services, including a certificate brokerage service 106. For instance, a user of a non-root user device 102 may register the device by associating the non-root user device 102 with one or more user accounts across various services. The user may include an individual, organization, automated process, or other entity that utilizes the non-root user device 102 for one or more purposes, including accessing third-party services. Hereinafter, the root user device and the non-root user device may be referred to as a root user system and a non-root user system, respectively.

The certificate brokerage service 106 may include one or more computer systems, processes, and/or applications that are configured to manage and enable communication of requests from the non-root user devices 102 to a root user device 108 corresponding to a user account. For instance, the certificate brokerage service 106 may transmit any incoming digital certificate signing requests 104 from the one or more non-root user devices 102 to the corresponding root user device 108 for processing. Further, the certificate brokerage service 106 may persist one or more user accounts to enable a user to assign a root user device 108 to perform as a certificate authority associated with the user account and specific to the user. The root user device 108, similar to the non-root user devices 102, may include a desktop computer, a tablet computer, a laptop computer, smartphone, smartwatch, or any other computing device as selected by the user.

In an embodiment, a user of the root user device 108 transmits a request to the certificate brokerage service 106 to register the root user device 108 as a certificate authority associated with the user's account. The user, through the root user device 108, may generate a cryptographic key pair comprising a private cryptographic key that can be used for digitally signing digital certificates and requests to the certificate brokerage service 106 and a public cryptographic key that can be provided to the certificate brokerage service 106 and other third-party service for verification of digital certificates generated by the root user device 108. Through the request, the root user device 108 can provide the generated public cryptographic key, as well as other information (e.g., root user device configuration information, Internet Protocol (IP) addresses for the root user device 108, geographic location of the root user device 108, etc.) that can be used to establish an identity anchor for the user and the root user device 108. This may enable third-party services to verify whether the root user device 108 digital certificate and any other digital certificates 110 generated by the root user device 108 can be trusted. The user may further provide the public cryptographic key of the cryptographic key pair to any third-party services that the user may interact with using the root user device 108 and/or the non-root user devices 102. This may enable the third-party services to utilize the public cryptographic key to verify the digital signature of the root user device 108 included in the digital certificate 110.

If the user obtains a new non-root user device 102 that requires a digital certificate from the root user device 108, the user may register the non-root user device 102 with the certificate brokerage service. For instance, the user may interact with an application or other process operating on the non-root user device 102 to generate a local cryptographic key pair for the non-root user device 102. This cryptographic key pair may be used by the non-root user device to digitally sign requests to third-party services and to the root user device 108, as will be described in greater detail below. Additionally, the user may provide the non-root user device 102 with verification data that may be used by the root user device 108 to determine whether a digital certificate signing request from the non-root user device 102 is valid. For instance, the user may provide, through the non-root user device 102, information that is unique to the non-root user device 102 and/or the user. This information may include an IP address of the non-root user device 102, an image obtained through a peripheral device of the non-root user device 102, a unique message from the user, a unique set of temporary credentials created by the user, a timestamp for when the digital certificate signing request was generated, geographic information regarding the physical location of the non-root user device 102, and the like. In some embodiments, the verification data may include one or more codes obtained from the root user device 108. For instance, the user may interact with the root user device 108 to generate a unique code. The user may be required to input this code to the non-root user device 102, which may append the request with this unique code.

In some embodiments, the user of the non-root user device 102 is prompted by the non-root user device 102 to provide a temporary password or other temporary credential that can be used to encrypt the verification data. The temporary password may preferably include a set of characters that are memorable to the user as the user may be required to provide the temporary password to the root user device 108 to decrypt the verification data in response to the root user device 108 having received the digital certificate signing request. In an embodiment, the non-root user device 102 obtains the public cryptographic key of the root user device 108 from the certificate brokerage service 106 and utilizes this public cryptographic key to encrypt the verification data that is to be provided to the root user device 108. The non-root user device 102 may add the encrypted verification data to the digital certificate signing request 104 and transmit this request 104 to the certificate brokerage service 106 for processing and routing.

In response to obtaining a new digital certificate signing request 104 from a non-root user device 102, the certificate brokerage service 106 may identify the user's account as created during the registration of the root user device 108 or at some other time. Alternatively, if the user has not previously created a user account with the certificate brokerage service 106, the certificate brokerage service 106 may prompt the user to create a new user account and to assign a root user device 108 that may be used as the user's personal certificate authority. If there is an active user account with the certificate brokerage service 106, the certificate brokerage service 106 may access the user's account and identify the root user device 108 that has been configured to operate as the user's personal certificate authority. The certificate brokerage service 106 may utilize this information to transmit the digital certificate signing request 104 to the root user device 108 for processing.

The root user device 108 may obtain the digital certificate signing request 104 from the certificate brokerage service 106 and begins analysis of the request to determine whether to issue a digital certificate 110 to the non-root user device 102. For instance, in response to the request, the root user device 108 may prompt the user to provide a shared secret (e.g., temporary password, unique phrase, song lyrics, etc.) or a public cryptographic key that can be used to decrypt the verification data provided by the non-root user device 102. The root user device 108 may use the shared secret or the public cryptographic key to decrypt the verification data, which the root user device 108 can evaluate to determine whether the digital certificate signing request 104 is valid. For instance, the root user device 108 may present, through one or more peripheral devices or interfaces of the device, the verification data to the user. The user, through the root user device 108, may evaluate the verification data and determine whether the user or other authorized entity (e.g., other user associated with the user, etc.) generated the verification data. If the request is valid, the root user device 108 may generate a digital certificate 110 that includes the root user device's own digital certificate, the non-root user device 102 public cryptographic key, and a digital signature created using the root user device 108 private cryptographic key. The digital certificate 110 may include additional information that may be used to determine whether the digital certificate 110 can be trusted. For instance, the validity period of the digital certificate 110, identifiers for the root user device 108 and the certificate brokerage service 106, an identifier for the digital signature algorithm, and the like. The digital certificate 110 may further define a uniform resource identifier (URI) for the certificate brokerage service 106 or a separate server that may maintain a certificate revocation list that third-party services may access to determine the status of the digital certificate 110. The root user device 108 may issue the digital certificate 110 to the non-root user device 102. Alternatively, the root user device 108 may transmit the digital certificate 110 to the certificate brokerage service 106, which may notify the non-root user device 102 that the digital certificate 110 has been made available. It should be noted that the digital certificate 110 does not include a digital signature of a certificate authority not associated with the user of both the root user device 108 and the non-root user device 102.

In an embodiment, the non-root user device 102 evaluates all active digital certificates issued by the root user device 108 to determine whether any of the active digital certificates are about to expire. If a digital certificate 110 is about to expire, the non-root user device 102 may generate a new cryptographic key pair and a digital certificate signing request that includes the public cryptographic key of this new cryptographic key pair. Since the root user device 108 still has stored the old public cryptographic key for this non-root user device 102, the non-root user device 102 may utilize the old private cryptographic key to digitally sign the digital certificate signing request 104 that is to be sent to the root user device 108. The non-root user device 102 may transmit this newly created digital certificate signing request 104 to the certificate brokerage service 106, which may provide this request to the root user device 108. The root user device 108 may utilize the non-root user device's old public cryptographic key to verify the digital signature. If the digital signature is successfully verified, the root user device 108 may generate a new digital certificate 110 that incorporates the new public cryptographic key from the non-root user device 102. The root user device 108 may issue this new digital certificate 110 to the non-root user device 102 and revoke the expiring digital certificate. For instance, the root user device 108 may access the certificate brokerage service 106 and transmit a request to revoke the expiring digital certificate. This may cause the certificate brokerage service 106 to update the revocation list to indicate that the expiring digital certificate has been revoked.

Figure 2:
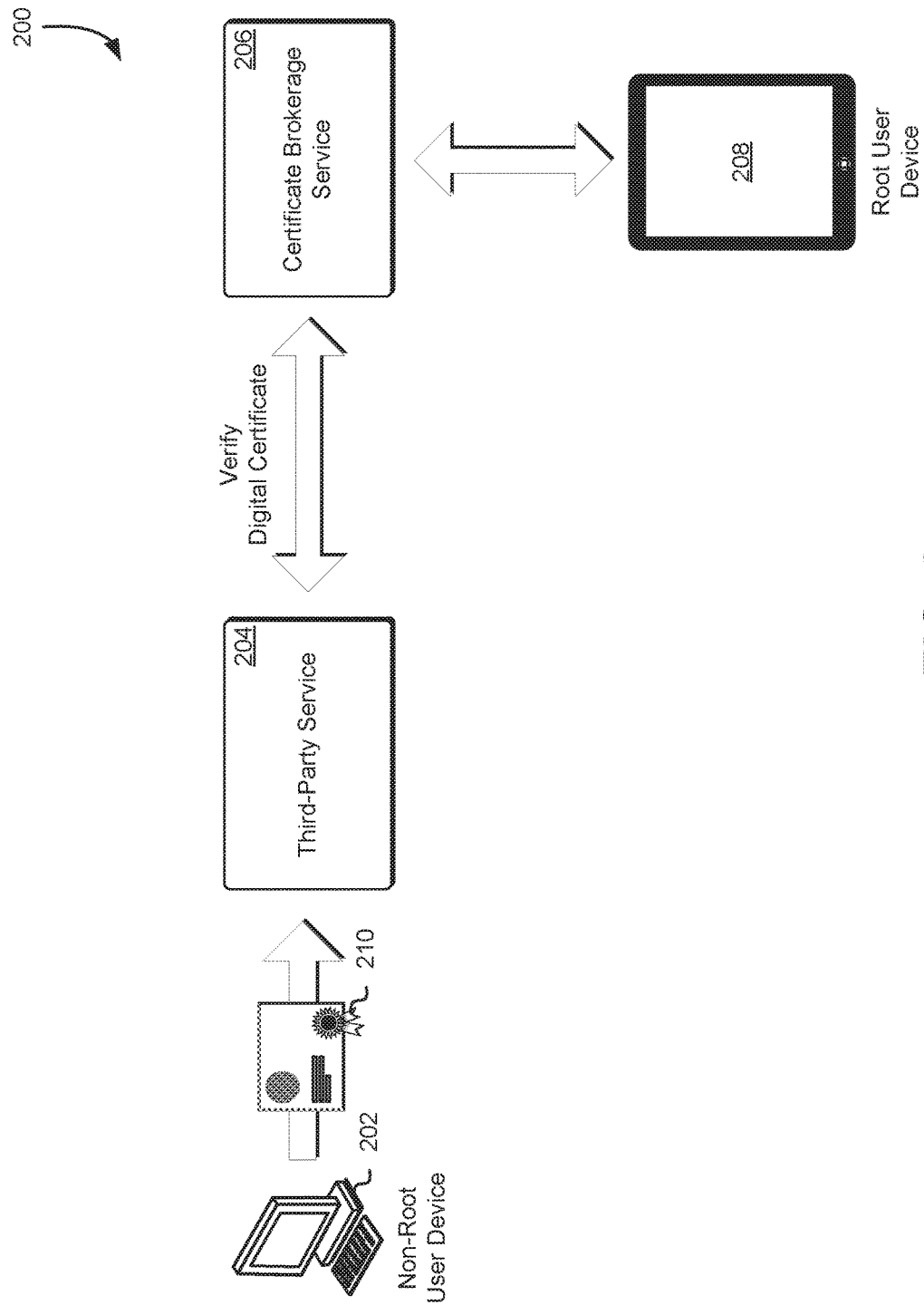
FIG. 2 shows an illustrative example of an environment in which a third-party service verifies a digital certificate issued by a root user device in response to a request obtained from another user device to access the third-party service in accordance with at least one embodiment.

FIG. 2 shows an illustrative example of an environment 200 in which a third-party service 204 verifies a digital certificate 210 issued by a root user device 208 in response to a request obtained from a non-root user device 202 to access the third-party service 204 in accordance with at least one embodiment. In the environment 200, a non-root user device 202 submits a request to a third-party service 204 to perform one or more operations. For instance, a non-root user device 202 may access the third-party service 204 to interact or otherwise utilize one or more computing resources made available by the third-party service 204. The request to the third-party service 204 may be digitally signed by the non-root user device 202 through use of its private cryptographic key. Further, the non-root user device 202 may include, with the request, a digital certificate 210 issued by the root user device 208 as described above.

In response to the request, the third-party service 204 may evaluate the root user device 208 public cryptographic key to determine whether the key can be trusted for verifying the digital certificate 210. For instance, in an embodiment, the user, through the root user device 208, can access each third-party service 204 that the user has an account in and provide the public cryptographic key of the root user device 208 to the third-party service 204. Alternatively, the third-party service 204 transmit a request to the certificate brokerage service 206 to request the public cryptographic key associated with the root user device 208 identified in the digital certificate 210. In some embodiments, the digital certificate 210 includes a digital certificate of the root user device 208 that includes the public cryptographic key of the root user device 208. The third-party service 204 may evaluate a revocation list made available by the certificate brokerage service 206 to determine whether the digital certificate of the root user device 208 is still active and can be trusted.

If the third-party service 204 determines that the public cryptographic key of the root user device 208 can be trusted, the third-party service 204 may use the public cryptographic key of the root user device 208 to verify the digital signature of the received digital certificate 210. For instance, the third-party service 204 may obtain, from the digital certificate 210, the public cryptographic key of the root user device 208, which may be used to verify the corresponding digital signature of the root user device 208. If the digital signature of the root user device 208 cannot be verified using the public cryptographic key of the root user device 208, then the digital signature may not be valid and the third-party service 204 may determine that the digital certificate 210 cannot be trusted. Alternatively, if the digital signature is deemed to be valid, the third-party service 204 may determine that digital certificate 210 can be trusted.

If the third-party service 204 determines that the digital certificate 210 from the non-root user device 202 can be trusted, the third-party service 204 may obtain the non-root user device's public cryptographic key from the digital certificate 210. The third-party service 204 may use the non-root user device's public cryptographic key to determine whether the digital signature of the non-root user device 202 (e.g., the digital signature of the request) is valid. Similar to the process described above, the third-party service 204 may use the public cryptographic key to verify the digital signature of the request. If the digital signature of the request cannot be verified using the public cryptographic key, then the digital signature may not be valid. If so, the third-party service 204 may deny the request from the non-root user device 202. Alternatively, if the third-party service 204 determines that the digital signature of the request is valid, the third-party service 204 may fulfill the received request, subject to any policies applicable to the user's account.

In some embodiments, a user can register multiple root user devices 208 that are each used to digitally sign each digital certificate 210 provided to the non-root user device 202. If the user has registered multiple root user devices 208 with the certificate brokerage service 206, the user may provide all public cryptographic keys generated by the root user devices 208 to the third-party service. Thus, the third-party service 204 may be required to use each root user device's public cryptographic key to verify each corresponding digital signature of the root user device 208 in the digital certificate 210. If the third-party service 204 is unable to verify any of the digital signatures of the root user devices 208 in the digital certificate 210, the third-party service may deny the request. In some instances, the third-party service may fulfill the request if a minimum number of digital signatures are deemed to be valid. For instance, the user may specify criteria indicating that a request may be fulfilled if for an N number of root user devices 208 and corresponding digital signatures, an M number of digital signatures are valid, where M is less than N. Thus, if an M number of digital signatures or greater are valid, then the request can be fulfilled.

Figure 3:
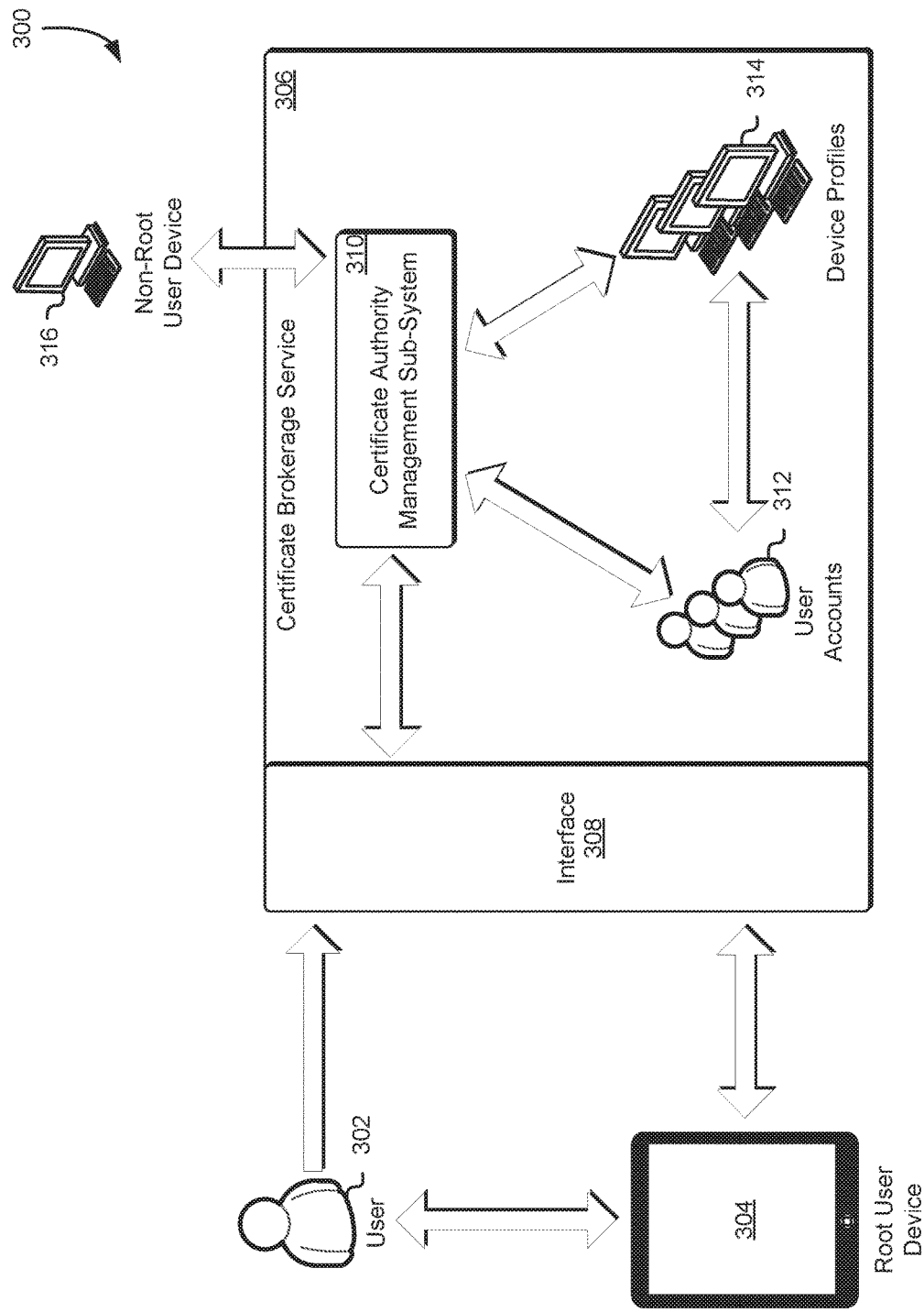
FIG. 3 shows an illustrative example of an environment in which a user configures, through a certificate brokerage service, a root user device to be utilized as a certificate authority for digital certificates in accordance with at least one embodiment.

As noted above, a user may transmit a request to a certificate brokerage service to generate a user account that may be used to synchronize the user's identity across myriad non-root user devices and a root user device that is assigned to act as the user's personal certificate authority. Through the certificate brokerage service, the user may provide a public cryptographic key of the root user device and other certificate authority artifacts that may be used to identify the root user device and verify that any digital certificates issued by the root user device can be trusted. Accordingly, FIG. 3 shows an illustrative example of an environment 300 in which a user 302 configures, through a certificate brokerage service 306, a root user device 304 to be utilized as a certificate authority for digital certificates in accordance with at least one embodiment.

In the environment 300, a user 302 transmits a request to the certificate brokerage service 306 to generate a user account 312 that can be used to synchronize the user's identity across one or more non-root user devices 316 and controlled by a root user device 304. The certificate brokerage service 306 may include an interface 308 that the user may utilize to generate the user account 312. For instance, the interface 308 may include a graphical user interface (GUI), which the user 302 may use to specify its personal information (e.g., name, contact information, payment information, etc.) and other information germane to creating the user account 312. The interface 308 may transmit the user request to generate the new user account 312 to a certificate authority management sub-system 310 for processing. The certificate authority management sub-system 310 may include one or more computer systems, applications, or processes that manage and maintain various user accounts 312 and user device profiles 314 on behalf of users of the certificate brokerage service 306. The certificate authority management sub-system 310 may also mediate communications among any non-root user devices 316 and corresponding root user devices 304 to enable issuance of digital certificates to the non-root user devices 316. In response to the request from the user 302, the certificate authority management sub-system 310 may generate a user account 312 for the user 302. The user account 312 may include a unique identifier that may be used by other devices or the user 302 to access the user account 312 or otherwise enable the certificate brokerage service 306 to identify the user account 312.

The user 302 may further utilize the certificate brokerage service 306 to register a root user device 304 for use as a personal certificate authority for synchronizing the user's identity across various non-root user devices 316. For instance, through the root user device 302, the user 302 may transmit a request to the certificate brokerage service 306 to register the root user device 304 as a certificate authority for the user 302. The user 302, through the root user device 304, may generate a cryptographic key pair comprising a private cryptographic key that can be used for digitally signing digital certificates and requests to the certificate brokerage service 306 and a public cryptographic key that can be provided to the certificate brokerage service 306 and other third-party services for verification of digital certificates generated by the root user device 304. Through the request, the root user device 304 can provide the generated public cryptographic key, as well as other information that can be used to establish an identity anchor for the user 302 and the root user device 304. The certificate authority management sub-system 310 may process the request to register the root user device 304 as a certificate authority by generating a device profile 314 for the root user device 304. The device profile 314 may specify a unique identifier for the root user device 304, as well as information usable to locate the root user device 304 to enable transmission of requests from the non-root user devices 316 to obtain a digital certificate. The certificate authority management sub-system 310 may further populate the device profile 314 for the root user device 304 with the public cryptographic key of the root user device 304 and metadata that may be utilized as an identity anchor for the user 302.

If the user 302 wishes to obtain a digital certificate for a non-root user device 316, the user 302, through the non-root user device 316, may generate a digital certificate signing request that includes account information for the user 302. The request may further include encrypted verification data and the non-root user device's public cryptographic key that is to be included in the issued digital certificate. The certificate authority management sub-system 310 may obtain the digital certificate signing request from the non-root user device 316 and utilize the account information included with the request to identify the user account 312 associated with the user 302. The certificate authority management sub-system 310 may evaluate the user account 312 to determine whether there is a root user device 304 associated with the account 312. If not, the certificate authority management sub-system 310 may transmit a notification to the user 302 indicating that no root user device 304 is associated with the user account 312. The certificate authority management sub-system 310 may further enable the user 302 to assign a user device to be a root user device 304 configured to act as the certificate authority.

If the user account 312 specifies a root user device 304 that is assigned to perform as a personal certificate authority for the user 302, the certificate authority management sub-system 310 may obtain a unique root user device identifier from the user account 312. The certificate authority management sub-system 310 may utilize this unique root user device identifier to identify the device profile corresponding to the root user device 304. The certificate authority management sub-system 310 may evaluate the device profile 314 of the root user device 304 to obtain information usable to establish a communications channel with the root user device 304 and transmit the digital certificate signing request from the non-root user device 316 to the root user device 304. Alternatively, the certificate authority management sub-system 310 may generate a device profile 314 for the non-root user device 316, which may specify its association with the root user device 304. The certificate authority management sub-system 310 may store the digital certificate signing request within the non-root user device's device profile 314 and transmit a notification to the root user device 304 indicating that a new digital certificate signing request is available.

The root user device 304 may receive the digital certificate signing request from the certificate brokerage service 306 through the interface 308. In response to the request, the root user device 304 may determine whether to issue a digital certificate to the non-root user device 316. If the root user device 304, based at least in part on the determination, issues a digital certificate to the non-root user device 316, the root user device 304 may transmit the digital certificate to the certificate authority management sub-system 310, which may store the digital certificate within the device profile 314 of the non-root user device 316. The certificate authority management sub-system 310 may further transmit a notification to the non-root user device 316 to indicate that a new digital certificate has been issued to the non-root user device 316. This may cause the non-root user device 316 to access the certificate brokerage service 306 to obtain the newly issued digital certificate. In some examples, the certificate brokerage service 306 maintains a revocation list or other database of digital certificates that may be used to determine whether a digital certificate is active or has otherwise not been revoked. Thus, if the root user device 304 issues a new digital certificate to the non-root user device 316, the certificate brokerage service 306 may update this database of digital certificates to indicate that the newly issued digital certificate is active.

Figure 4:
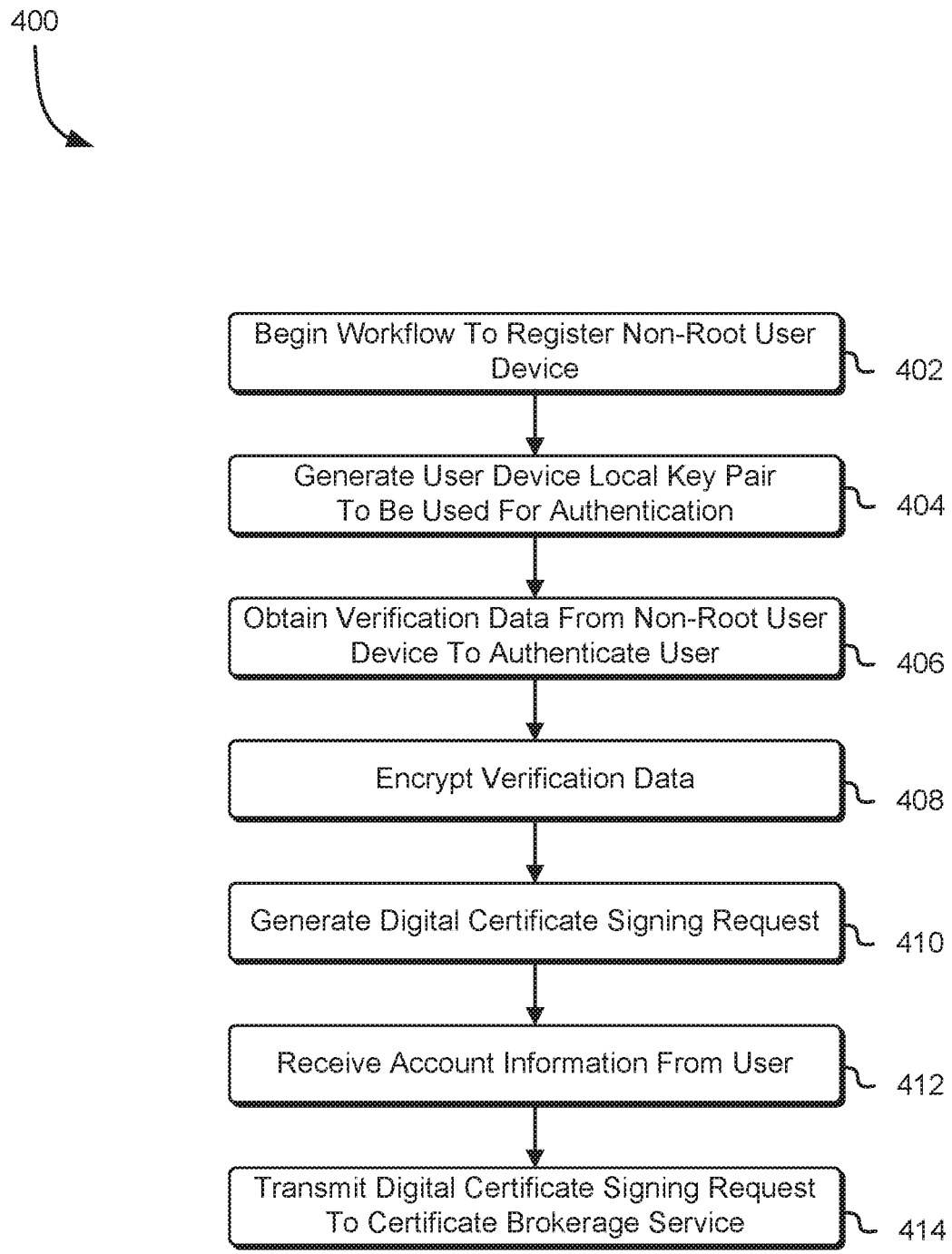
FIG. 4 shows an illustrative example of a process for transmitting a request to obtain a digital certificate for a non-root user device in accordance with at least one embodiment.

As noted above, a user may register a non-root user device to generate one or more digital certificate signing requests to obtain digital certificates that may be used to authenticate the non-root user device. Accordingly, FIG. 4 shows an illustrative example of a process 400 for transmitting a request to obtain a digital certificate for a non-root user device in accordance with at least one embodiment. The process 400 may be performed by any non-root user device that can transmit requests to the certificate brokerage service and that can generate cryptographic key pairs for the device itself. Through the process 400, the user may begin 402 a workflow to register the non-root user device for use with the certificate brokerage service and any other third-party services. For instance, the user may provide its personal information to the non-root user device, including contract information, payment information, name, etc. The non-root user device may provide this information, as well as other device information (e.g., serial number, IP address, etc.) to the certificate brokerage service and to any other third-party services based at least in part on configuration of the device. In some examples, the certificate brokerage service may use the information provided by the non-root user device registration process to generate a device profile for the non-root user device.

The non-root user device may obtain an indication from the certificate brokerage service and any other third-party services that the registration workflow was performed successfully. In response to this indication, the non-root user device may generate 404, or otherwise obtain, a non-root user device local cryptographic key pair that may be used for authentication of the non-root user device. The cryptographic key pair may include a private cryptographic key that the non-root user device may use to digitally sign any requests to third-party services or to the root user device if a digital certificate is to be obtained in response to an upcoming expiration of the original digital certificate. The cryptographic key pair may further include a corresponding public cryptographic key that may be distributed to various services and entities to enable these services and entities to verify digital signatures generated by the non-root user device using the private cryptographic key. The cryptographic key pair may be generated using one or more algorithms such that the cryptographic keys have sufficient entropy to prevent the cryptographic keys from being guessed by another entity. In some embodiments, the non-root user device encrypts the private cryptographic key of the key pair using a password, biometric information, and/or other secret known only to the user of the non-root user device. Thus, in order for the non-root user device to generate third-party service requests, the user of the non-root user device may be prompted to provide the secret in order to enable the non-root user device to decrypt the private cryptographic key.

In addition to generating a cryptographic key pair specific to the non-root user device, the non-root user device may obtain 406 verification data from the device itself or from a user of the device. The verification data may be utilized by the root user device ultimately receiving the digital certificate signing request to verify that the request originated from the user or a trusted non-root user device. The verification data may include a timestamp for the request. For instance, the root user device may be configured to only process requests having a timestamp that does not exceed a particular threshold value established by the user (e.g., requests older than two minutes are considered invalid, etc.). Alternatively, the non-root user device may prompt the user to provide unique information that may be used as the verification data. This unique information may include song lyrics, unique phrases or sentences, unique character strings, a photographic image of the environment where the non-root user device is located, a photographic image of the user, a unique audio recording, and the like. In some embodiments, the user can utilize the root user device to generate a random and unique user code that, if inputted into the non-root user device, can be used as the verification data. For such embodiments, the root user device stores the unique user code and the timestamp at which the unique user code was generated. Thus, the verification data for the non-root user device may include the unique user code and the timestamp at which the unique user code was provided.

In some embodiments, the non-root user device encrypts 408 the verification data to prevent any other entity from spoofing a valid request, interfering with or otherwise modifying the verification data for its own purposes. The non-root user device may prompt the user to provide a temporary password that may be used to encrypt the verification data. The temporary password may include a string of characters that may be memorable to the user such that the user may provide the temporary password to the root user device. This may enable the root user device to decrypt the verification data and allow the user to evaluate the verification data to determine whether the request is valid. In an embodiment, the non-root user device may obtain a key (e.g., the public cryptographic key of the root user device from the certificate brokerage service, a public cryptographic key of a separate signing cryptographic key pair, etc.), as well as a fingerprint of the public cryptographic key that may be memorable to the user. The user may utilize the fingerprint to authenticate the public cryptographic key of the root user device. If the public cryptographic key of the root user device is successfully authenticated by the user, the non-root user device may use the public cryptographic key of the root user device to encrypt the verification data.

Using the encrypted verification data, the public cryptographic key generated by the non-root user device, and other device information (e.g., serial number, unique identifier, etc.), the non-root user device may generate 410 a digital certificate signing request. Additionally, the non-root user device may prompt the user to provide account information for the user's account with the certificate brokerage service that may be included with the digital certificate signing request. Through the non-root user device, the user may provide its unique account identifier, as well as the user's representation of its credentials to enable the non-root user device to access the certificate brokerage service. Thus, the non-root user device may receive 412 the user's account information associated with the certificate brokerage service. The non-root user device may use this obtained user account information to access the certificate brokerage service. In response to gaining access to the certificate brokerage service, the non-root user device may transmit 414 the digital certificate signing request to the certificate brokerage service for processing and routing.

Figure 5:
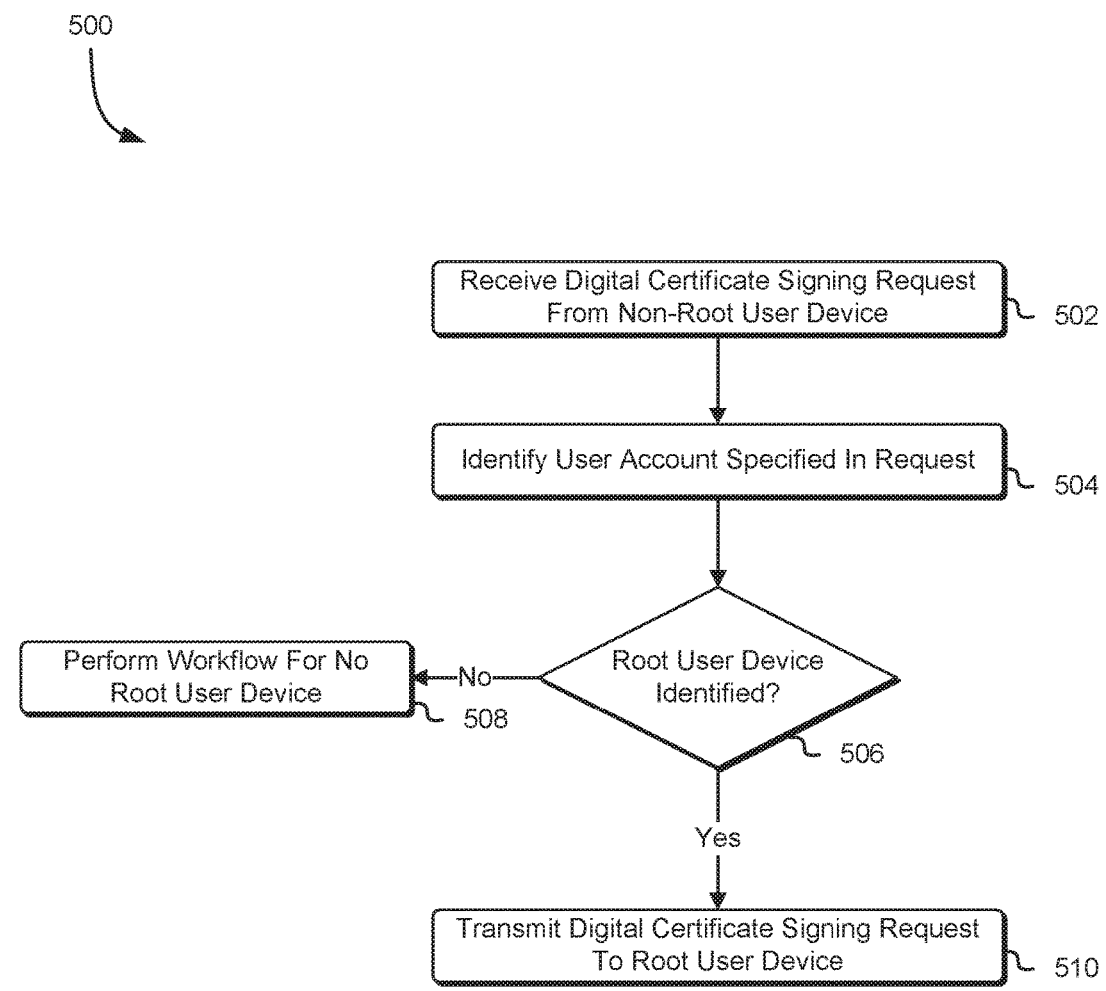
FIG. 5 shows an illustrative example of a process for transmitting digital certificate signing requests from non-root user devices to corresponding root user devices for issuance of digital certificates to the non-root user devices in accordance with at least one embodiment.

As noted above, the certificate brokerage service may receive incoming digital certificate signing requests from various non-root user devices that are intended for one or more root user devices associated with these non-root user devices. For instance, a digital certificate signing request may specify user account information that the service may utilize to identify a user account and, accordingly, the root user device associated with the user account. Based at least in part on information stored in the user account and in a corresponding device profile for the root user device, the certificate brokerage service may transmit the request to the root user device associated with the user account. Accordingly, FIG. 5 shows an illustrative example of a process 500 for transmitting digital certificate signing requests from non-root user devices to corresponding root user devices for issuance of digital certificates to the non-root user devices in accordance with at least one embodiment. The process 500 may be performed by the aforementioned certificate brokerage service, which may evaluate incoming digital certificate signing requests to identify a target root user device to which the request is to be provided.

At any time, the certificate brokerage service may receive 502 a digital certificate signing request from a non-root user device. As described above, the digital certificate signing request may include encrypted verification data and a public cryptographic key generated by the non-root user device and that is to be used in the creation of the digital certificate. Additionally, the request may include account information associated with a user who may have registered a corresponding root user device and the non-root user device with the certificate brokerage service. The account information may include a unique account identifier (e.g., account number, etc.) that may be associated with the user's account for the certificate brokerage service. Further, the account information may include a representation of the user's credentials, which the certificate brokerage service may use to authenticate the user. Based at least in part on the provided account information, the certificate brokerage service may identify 504 the user account specified in the request.

The certificate brokerage service may evaluate the user's account to determine 506 whether there is a root user device associated with the user's account that has been assigned to perform as the user's personal certificate authority. For instance, the user's account may specify a unique identifier for a corresponding device profile for the root user device assigned to perform as the user's personal certificate authority. Alternatively, if a root user device has not been registered for the user, the user's account may not include this unique identifier as no device profile may exist for the root user device. If the certificate brokerage service is unable to identify a root user device through the user's account, the certificate brokerage service may perform 508 a workflow for when there is no root user device. This may include transmitting a notification to the user of the non-root user device indicating that no root service device has been registered for the corresponding user account. Further, the certificate brokerage service may prompt the user to determine whether it would be interested in registering the non-root user device as a root user device that can be used as the user's personal certificate authority. The workflow may enable the user to select a root user device and register this root user device with the certificate brokerage service, as described above.

If the certificate brokerage service identifies, from the user's account, a corresponding root user device that has been assigned to perform as the user's personal certificate authority, the certificate brokerage service may access the device profile of the root user device. The device profile may include information about the root user device that may be used to determine the location of the root user device and to configure a communications channel with the root user device. For instance, the information included in the device profile may include the IP address of the root user device, an identifier for the root user device, the public cryptographic key of the root user device's cryptographic key pair, the digital certificate of the root user device, and the like. Using the information stored in the device profile of the root user device, the certificate brokerage service may establish a communications channel with the root user device and, through this communications channel, transmit 510 the digital certificate signing request from the non-root user device to the root user device.

It should be noted that the process 500 may be performed using alternative operations than those enumerated in FIG. 5. For instance, in some embodiments, the certificate brokerage service does not transmit the request to the root user device but rather stores the digital certificate signing request within a device profile for the non-root user device or in a dedicated datastore for digital certificate signing requests. The certificate brokerage service may transmit a notification to the root user device to indicate that a new digital certificate signing request from a non-root user device has been received by the certificate brokerage service. In response to the notification, the root user device may access the certificate brokerage service to obtain the digital certificate signing request from the non-root user device's device profile or from the dedicated datastore for digital certificate signing requests.

Figure 6:
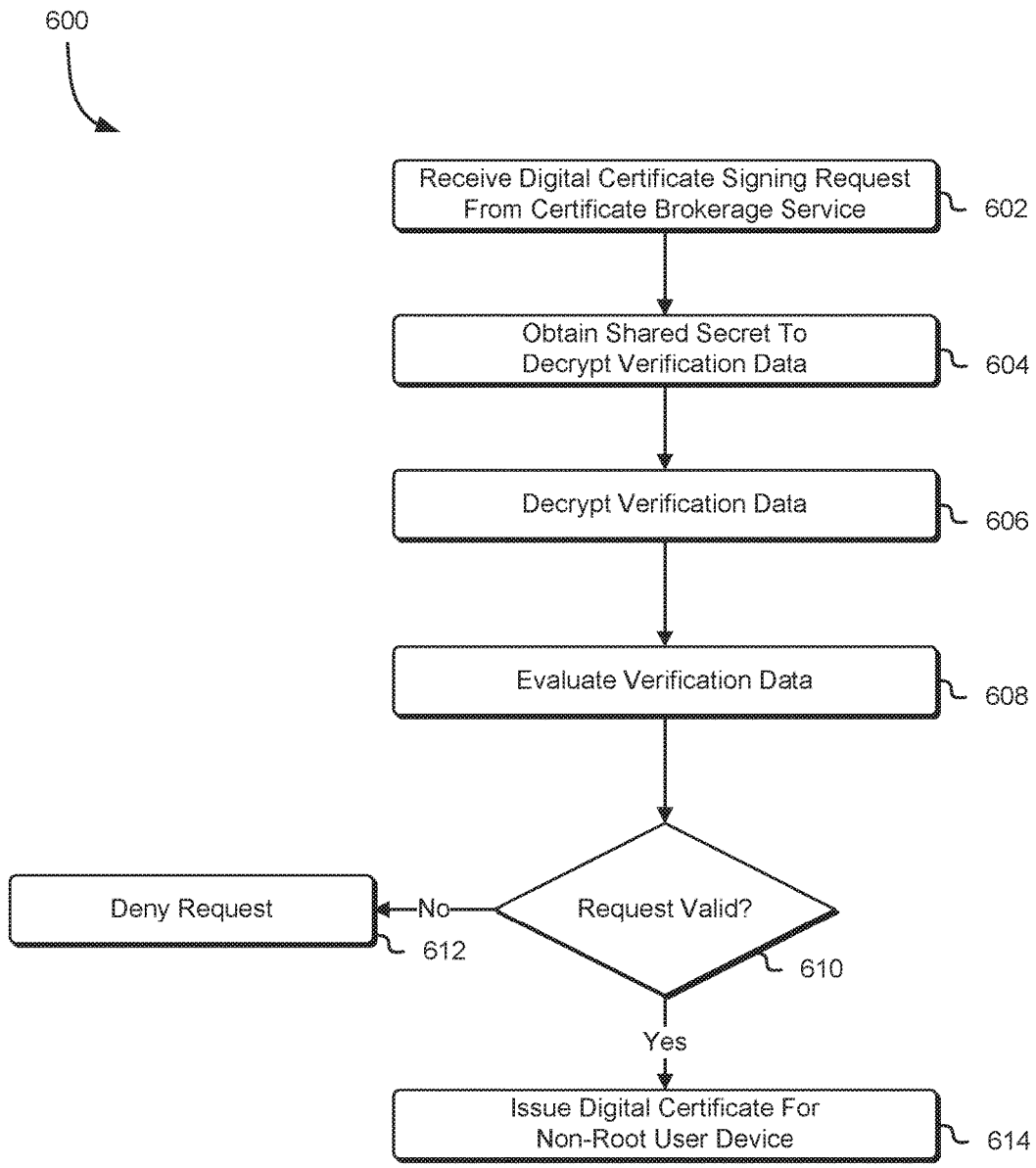
FIG. 6 shows an illustrative example of a process for issuing a digital certificate to a non-root user device in response to a digital certificate signing request from the certificate brokerage service in accordance with at least one embodiment.

As noted above, a root user device may receive, from the certificate brokerage service, a digital certificate signing request generated by a non-root user device associated with a user common to both the non-root user device and the root user device. Based at least in part on information included within the request, the root user device may determine whether to issue a digital certificate to the non-root user device. Accordingly, FIG. 6 shows an illustrative example of a process 600 for issuing a digital certificate to a non-root user device in response to a digital certificate signing request from the certificate brokerage service in accordance with at least one embodiment. The process 600 may be performed by a root user device configured to perform as a personal certificate authority for a user of the root user device and the non-root user device.

The root user device, at any time, may receive 602 a digital certificate signing request from the certificate brokerage service. As described above, in response to receiving a digital certificate signing request from a non-root user device, the certificate brokerage service may establish a communications channel with the root user device and transmit the digital certificate signing request to the root user device. Alternatively, the certificate brokerage service may store the request within a non-root user device's device profile or in a dedicated datastore for digital certificate signing requests. The certificate brokerage service may transmit a notification to the root user device indicating that a new digital certificate signing request has been received and has been stored within the non-root user device's device profile or in the dedicated datastore. This may cause the root user device to access the certificate brokerage service to obtain the digital certificate signing request generated by the non-root user device.

In response to the received digital certificate signing request, the root user device may obtain 604 a shared secret usable to decrypt the verification data included in the request. As described above in connection with the process 400, the non-root user device may utilize a temporary password provided by the user to encrypt verification data usable to validate the request. In some embodiments, the non-root user device may utilize, instead of a shared secret, the public cryptographic key generated by the root user device or a different public cryptographic key of a signing cryptographic key pair to encrypt the verification data. If the shared secret is the temporary password generated by the user to encrypt the verification data, the root user device may prompt the user to provide the temporary password used to encrypt the verification data. However, if the root user device's own public cryptographic key was used to encrypt the verification data, the root user device may obtain the public cryptographic key. The root user device may utilize this shared secret or the public cryptographic key to decrypt 606 the verification data. If the verification data cannot be successfully decrypted, the root user device may deny the request, as the request cannot be validated without confirmation of the verification data.

The root user device may evaluate 608 the decrypted verification data to determine 610 whether the digital certificate signing request is valid. For instance, if the verification data includes a timestamp for when the request was originally created, the root user device may evaluate the timestamp to determine whether a period of time between the time indicated on the timestamp and the time at which the root user device is evaluating the request is within a threshold time limit for incoming requests. If the period of time exceeds this threshold, the root user device may deny 612 the request as the extended delay in obtaining the request may indicate that the request has been tampered with by a malicious entity or can otherwise no longer be trusted. In alternative embodiment, if the verification data includes the timestamp and a unique user code purportedly generated by the root user device, the root user device evaluates the verification data by identifying the expected unique user code that would have been generated at the time specified in the received timestamp. For instance, the root user device may utilize one or more algorithms that utilize a timestamp as input to calculate the unique user code. If the provided unique user code matches the expected unique user code, then the root user device may determine that the request is valid. However, if there is no match, then the request may not be valid and the root user device may deny 612 the request.

As noted above, the verification data may further include any combination of an IP address of the non-root user device, an image obtained through a peripheral device of the non-root user device, a unique message from the user, a unique set of temporary credentials created by the user, a timestamp for when the digital certificate signing request was generated, geographic information regarding the physical location of the non-root user device 102, and the like. If the verification data was generated by the user, the root user device may present the verification data to the user. The user may evaluate the verification data to confirm that the verification data was generated by the user. If the user confirms that the verification data is valid, then the root user device may determine that the request itself is valid. However, if the user does not confirm that the verification is valid (e.g., the user fails to recognize the provided verification data), the root user device may deny 612 the request.

If the root user device determines that the digital certificate signing request is valid, the root user device may generate a digital certificate for the non-root user device. The root user device may utilize the information provided in the request to generate the various data fields of the digital certificate (e.g., unique device identifier, etc.) as well as information corresponding to the root user device (e.g., issuer information, etc.). The digital certificate may further include the public cryptographic key generated by the non-root user device and included in the received request. The root user device may utilize its private cryptographic key to digitally sign the digital certificate. The root user device may issue 614 this newly generated digital certificate for the non-root user device to the non-root user device. In some instances, the root user device may transmit the digital certificate to the certificate brokerage service, which may store the digital certificate within the non-root user device's device profile. The certificate brokerage service may transmit a notification to the non-root user device to indicate that the digital certificate is available through the device profile. The non-root user device may obtain the digital certificate from the certificate brokerage profile and utilize it for authentication purposes.

Figure 7:
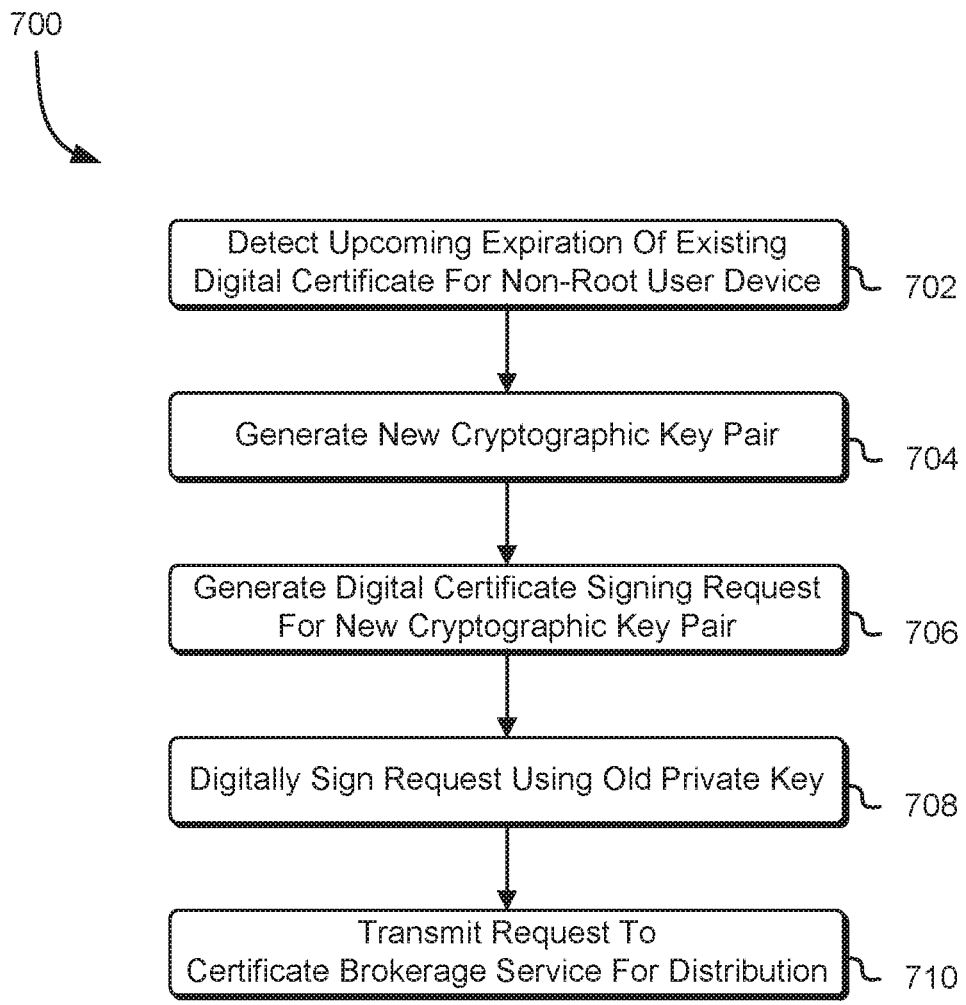
FIG. 7 shows an illustrative example of a process for transmitting a request to obtain a new digital certificate in response to detection of an upcoming expiration of an existing digital certificate in accordance with at least one embodiment.

In some embodiments, the non-root user device evaluates the digital certificate issued by the root user device to determine whether the digital certificate is set to expire within a short amount of time (e.g., within a day, a week, a month, etc.). If the non-root user device determines that the digital certificate is set to expire within the short amount of time, the non-root user device may generate a new cryptographic key pair and transmit a digital certificate signing request to obtain a new digital certificate to replace the expiring digital certificate. Accordingly, FIG. 7 shows an illustrative example of a process 700 for transmitting a request to obtain a new digital certificate in response to detection of an upcoming expiration of an existing digital certificate in accordance with at least one embodiment. The request 700 may be performed by the aforementioned non-root user device, which may be configured to evaluate any active digital certificates to determine the expiration date for these digital certificates.

The non-root user device may be configured to evaluate any active digital certificates to determine whether any active digital certificates are set to expire. For instance, the non-root user device may evaluate a digital certificate to determine whether the remaining validity period for the digital certificate is shorter than a predetermined tolerable validity period as specified by the user or through the configuration of an application or process installed on the non-root user device. Through this evaluation of the active digital certificates, the non-root user device may detect 702 that an existing digital certificate is set to expire. In response to detection of the upcoming expiration of the existing digital certificate, the non-root user device may generate 704 a new cryptographic key pair that may be used to digitally sign requests and serve as the basis for a new digital certificate. For instance, the public cryptographic key of this new cryptographic key pair may be provided in a replacement digital certificate to third-party services for authentication. The private cryptographic key may be used to digitally sign any new requests to these third-party services.

The non-root user device may generate 706, in response to detection of the upcoming expiration of the existing digital certificate, a new digital certificate signing request for the newly generated cryptographic key pair. This new digital certificate signing request may include the new public cryptographic key, as well as any additional information required by the root user device to generate the digital certificate. The new digital certificate signing request may further include user account information for a user account associated with the certificate brokerage service. Unlike the original digital certificate signing request generated to obtain a first digital certificate for the non-root user device, the digital certificate signing request generated to obtain a replacement digital certificate may not include the verification data for the non-root user device. However, in some embodiments, the user can provide verification data with the digital certificate signing request to provide an additional layer of security to the request.

In response to creation of the new digital certificate signing request, the non-root user device may utilize the old private cryptographic key to digitally sign 708 the request. As noted above, the root user device may maintain a copy of the non-root user device's public cryptographic key. Thus, the root user device may utilize the non-root user device's old public cryptographic key to verify the digital signature of the digital certificate signing request. The non-root user device may use the account information supplied by the user to transmit 710 the digitally signed digital certificate signing request to the certificate brokerage service for distribution to the target root user device. The certificate brokerage service may utilize the account information to identify the root user device associated with the user's account and transmit or otherwise make available the digital certificate signing request to the root user device.

In response to obtaining the digitally signed digital certificate signing request from the certificate brokerage service, the root user device may identify the old public cryptographic key of the non-root user device and utilize this old public cryptographic key to verify the digital signature included with the request. If the root user device is able to verify that the digital signature is valid, the root user device may transmit a request to the certificate brokerage service to revoke the expiring digital certificate. This may cause the certificate brokerage service to update a revocation list or other database of digital certificates to indicate that the expiring digital certificate has been revoked. Additionally, the root user device may store the received public cryptographic key included in the digital certificate signing request on behalf of the non-root user device for later use. If the digital certificate signing request includes verification data, the root user device may perform one or more operations similar to those described above in connection with FIG. 6 to determine whether the verification data is valid and, hence, whether the request itself is valid. If the request is valid, the root user device may generate and issue a new digital certificate to the non-root user device. This new digital certificate may specify a new validity period and may include the new public cryptographic key generated by the non-root user device. Further, the root user device may utilize its own private cryptographic key to digitally sign the digital certificate. Thus, a third-party service obtaining the digital certificate may verify that the digital certificate may be trusted.

It should be noted that in some embodiments, the root user device or the certificate brokerage service can detect an upcoming expiration of an existing digital certificate for the non-root user device. In response to this detection of the upcoming expiration of an existing digital certificate, the root user device may generate a new digital certificate for the non-root user device that includes the non-root user device's original public cryptographic key but specifies a new validity period for the digital certificate. The root user device may provide this newly generated digital certificate to the certificate brokerage service, which may cache the digital certificate for the non-root user device. The certificate brokerage service may transmit a notification to the non-root user device to indicate that the non-root user device's digital certificate is about to expire and that a new digital certificate is available in the cache. Thus, the non-root user device may obtain, from the certificate brokerage service, the new digital certificate without having to generate a new cryptographic key pair or generate a new digital certificate signing request.

Figure 8:
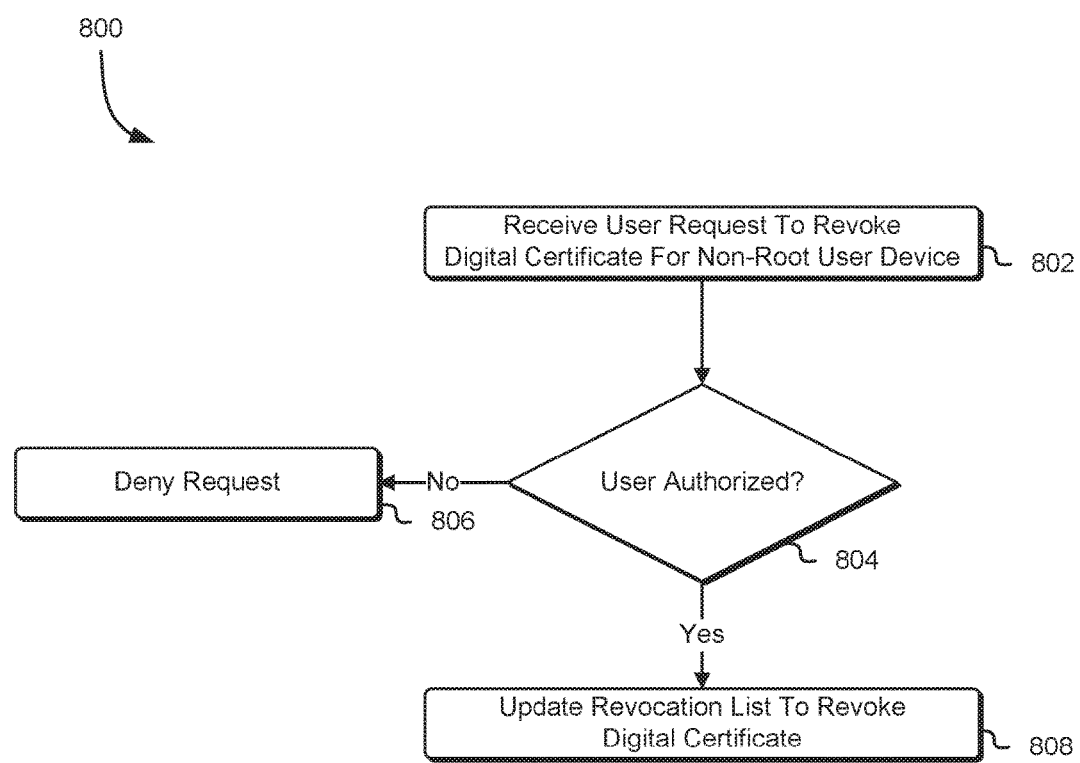
FIG. 8 shows an illustrative example of a process for revoking a digital certificate for a non-root user device in response to a user request in accordance with at least one embodiment.

At any time, a user may submit a request to the certificate brokerage service to revoke a digital certificate for a non-root user device. For instance, if the non-root user device is stolen, lost, or damaged, the user may want to make sure that no other users may utilize the non-root user device to access third-party services using the user's identity, which may expose the user to potential fraud. Accordingly, FIG. 8 shows an illustrative example of a process 800 for revoking a digital certificate for a non-root user device in response to a user request in accordance with at least one embodiment. The process 800 may be performed by the certificate brokerage service, which may maintain a device profile for each non-root user device registered with the service. Further, the certificate brokerage service may manage a revocation list or other database of digital certificates that may be used to denote whether a particular digital certificate has been revoked or is active.

The certificate brokerage service may receive 802 a request from a user to revoke an existing digital certificate for a non-root user device. The request may specify a unique identifier for the non-root user device, which the certificate brokerage device may use to identify a device profile of the non-root user device. This device profile may include a public cryptographic key of the non-root user device, as well as the digital certificate for the non-root user device provided by the root user device to the service. Alternatively, if the root user device has not provided a copy of the digital certificate to the certificate brokerage service, the certificate brokerage service may request specific information from the user that may be used to identify the digital certificate from the revocation list or other database of digital certificates.

In response to the request from the user, the certificate brokerage service may determine 804 whether the user is authorized to revoke the digital certificate of the non-root user device. For instance, if the user of the non-root user device is a subordinate of the user that registered the root user device and the non-root user device, the user of the non-root user device may not be authorized to manage digital certificates for the non-root user device. Thus, for such a user, the certificate brokerage service may deny the request. However, if the certificate brokerage service determines that the user is authorized to revoke the digital certificate for the non-root user device, the certificate brokerage service may update 808 the revocation list or other database of digital certificates to indicate that the digital certificate for the non-root user device has been revoked. Thus, if a third-party service receives the revoked digital certificate from the non-root user device or from another device, the third-party service may evaluate the revocation list or other database of digital certificates to determine that the provided digital certificate has been revoked. This may cause the third-party service to deny any requests from the non-root user device or other device using the revoked digital certificate.

Figure 9:
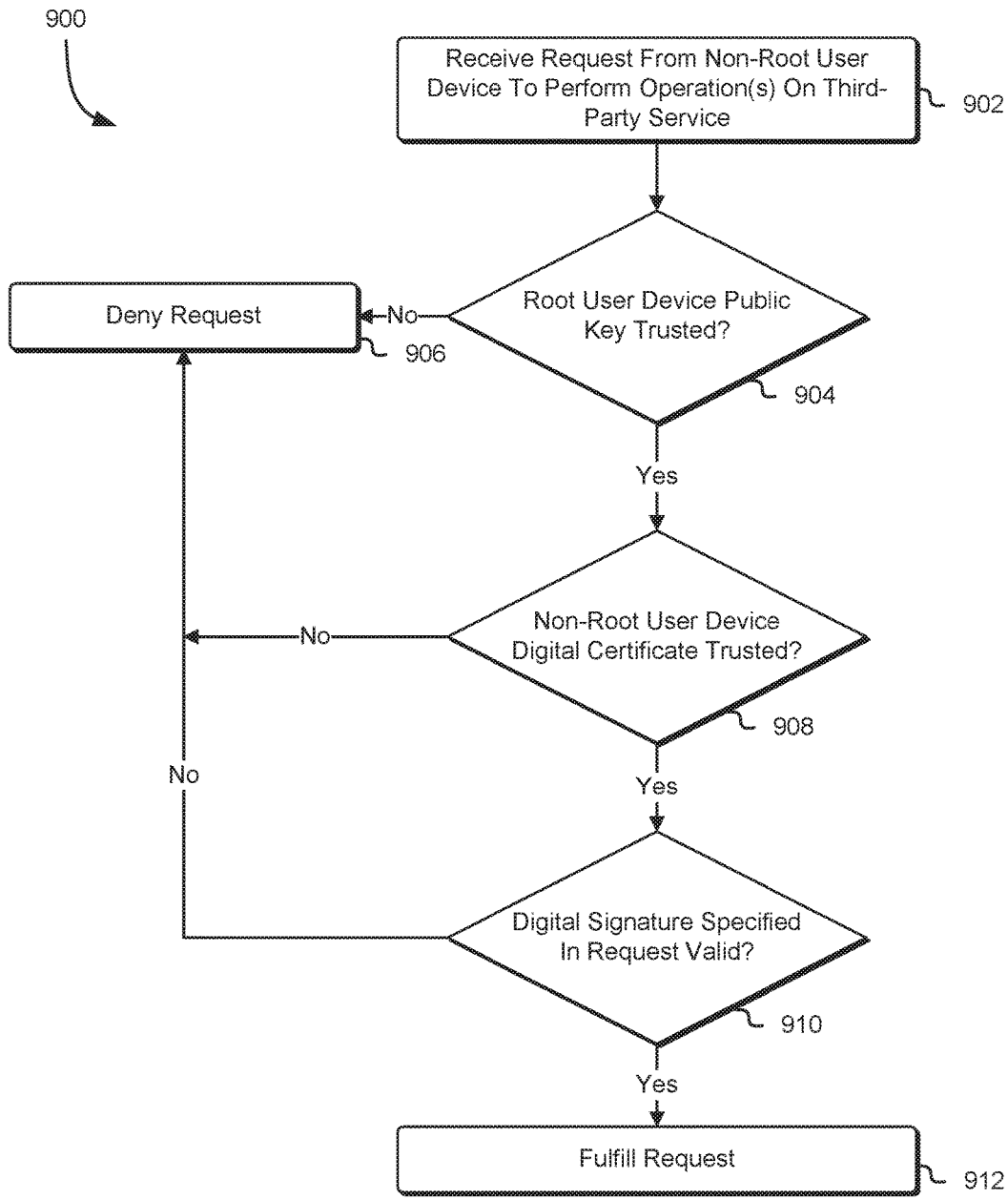
FIG. 9 shows an illustrative example of a process for evaluating incoming requests to perform one or more operations on a third-party service to determine whether the requests are to be fulfilled in accordance with at least one embodiment.

As noted above, a third-party service may evaluate a digital certificate included in a request to perform one or more operations to determine whether the request is to be fulfilled. The request may be generated by a non-root user device and may be digitally signed using the non-root user device's private cryptographic key. The digital certificate may include the non-root user device's public cryptographic kay and may further be digitally signed using the private cryptographic key of the root user device's cryptographic key pair. Thus, the third-party service may be required to determine whether these keys and digital signatures can be trusted in order to either fulfill or deny the incoming request. Accordingly, FIG. 9 shows an illustrative example of a process 900 for evaluating incoming requests to perform one or more operations on a third-party service to determine whether the requests are to be fulfilled in accordance with at least one embodiment. The process 900 may be performed by any third-party service that receives a digitally signed request from a non-root user device that includes a digital certificate issued by a corresponding root user device.

In the process 900, the third-party service may receive 902 a request from a non-root user device to perform one or more operations on the third-party service. For instance, the non-root user device may transmit a request to interact with one or more computing resources made available by the third-party service to users of the third-party service. Alternatively, the non-root user device may transmit a request to access the user's account for the third-party service. The non-root user device may also transmit a request for authentication. The request from the non-root user device may be digitally signed using a private cryptographic key of a cryptographic key pair generated by the non-root user device. The request may further include a digital certificate issued by the root user device. This digital certificate may include the non-root user device's public cryptographic key of the cryptographic key pair, as well as information that may be used to determine whether the digital certificate is valid, the root user device utilized to issue the digital certificate, information concerning the certificate brokerage service, and a URI or other information usable to access a revocation list or other database of digital certificates to determine whether the digital certificate has been revoked or is still active. The digital certificate may be signed using a private cryptographic key of a cryptographic key pair generated by the root user device prior to issuance of the digital certificate to the non-root user device.

In response to the received request from the non-root user device, the third-party service may determine 904 whether the public cryptographic key of the root user device can be trusted for verifying the digital signature of the digital certificate. In an embodiment, a user of the root user device can access the third-party service prior to transmission of the present request to provide the public cryptographic key of the cryptographic key pair generated by the root user device. Since the public cryptographic key was provided by the user itself (e.g., the user is authorized to access the third-party service to provide the key), the third-party service may inherently trust the public cryptographic key. In an alternative embodiment, the digital certificate includes a root user device digital certificate that includes the public cryptographic key. In response to the request, the third-party service may access a URI specified in the root user device digital certificate to determine whether this digital certificate is active or has been revoked. If the root user device certificate has been revoked, then the third-party service may determine that the public cryptographic key in the root user device certificate cannot be trust and may deny 906 the request. In some embodiments, the third-party service transmits a request to the certificate brokerage service to determine whether the root user device's public cryptographic key is valid. The certificate brokerage service may have a copy of the public cryptographic key, which the service may use to determine whether the public cryptographic key included in the request matches the copy of the key stored by the certificate brokerage service. If they do not match, then the public cryptographic key of the root user device cannot be trusted and the request will be denied.

If the third-party service determines that the root user device public cryptographic key can be trusted, the third-party service may determine 908 whether the received non-root user device digital certificate can be trusted. As described above, the digital certificate may be digitally signed by the root user device using a private cryptographic key of a cryptographic key pair generated by the root user device. The third-party service may utilize the public cryptographic key of the cryptographic key pair generated by the root user device either provided in the digital certificate or previously obtained from the user to determine whether the digital signature is valid or not. For instance, the third-party service may utilize a hashing algorithm specified in the digital certificate to hash the digital certificate. The third-party service may also utilize the public cryptographic key to decrypt the digital signature of the digital certificate. If these values match, then the digital signature is valid and the digital certificate can be trusted. However, if these values do not match, the third-party service may determine that the digital signature of the digital certificate is not valid and, as a result, deny 906 the request.

In addition to verifying the digital signature of the digital certificate to determine whether the digital certificate can be trusted, the third-party service may evaluate the information specified in the digital certificate to determine whether the digital certificate can be trusted. For instance, the third-party service may evaluate the validity period specified in the digital certificate to determine whether the digital certificate has expired or is still active. Further, the third-party service may access a revocation list or other database of digital certificates to determine whether the digital certificate has been previously revoked by the user or other authorized entity. The third-party service may further evaluate the digital certificate to ensure that the digital certificate was issued to the non-root user device that submitted the request. If the third-party service determines that the digital certificate cannot be trusted based at least in part on the information specified in the digital certificate, the third-party service may deny 906 the request.

If the third-party service determines that the non-root user device digital certificate can be trusted, the third-party service may use the included public cryptographic key of the non-root user device's cryptographic key pair to determine 910 whether the digital signature specified in the received request is valid. The third-party service may utilize a hashing algorithm to hash the received request. The third-party service may further utilize the public cryptographic key from the digital certificate to decrypt the digital signature of the received request. If the hashed request and the decrypted digital signature match, then the digital signature may be deemed valid and the third-party service may fulfill 912 the received request in accordance with any applicable user policies implemented by the third-party service. However, if there is no match, the third-party service may deny 906 the request.

It should be noted that the operations specified in the process 900 used to verify that the request is valid may be performed in any order. For instance, the third-party service may determine whether the digital signature specified in the request is valid prior to checking the whether the root user device public key and the non-root user device digital certificate can be trusted. Since failure of any of these checks would result in the request being denied, the third-party service may perform these checks in any order so long as the cryptographic keys necessary to perform the checks are made available through the received request and, in some cases, through the certificate brokerage service. In some embodiments, if the third-party service determines that the request can be fulfilled, the third-party service issues a session token to the non-root user device. The session token may be used by the non-root user device to access the third-party service and have requests fulfilled without the third-party service having to execute process 900 each time the non-root user device provides the session token. Thus, the third-party service may verify that the session token is valid and, if so, fulfill the request from the non-root user device.

Figure 10:
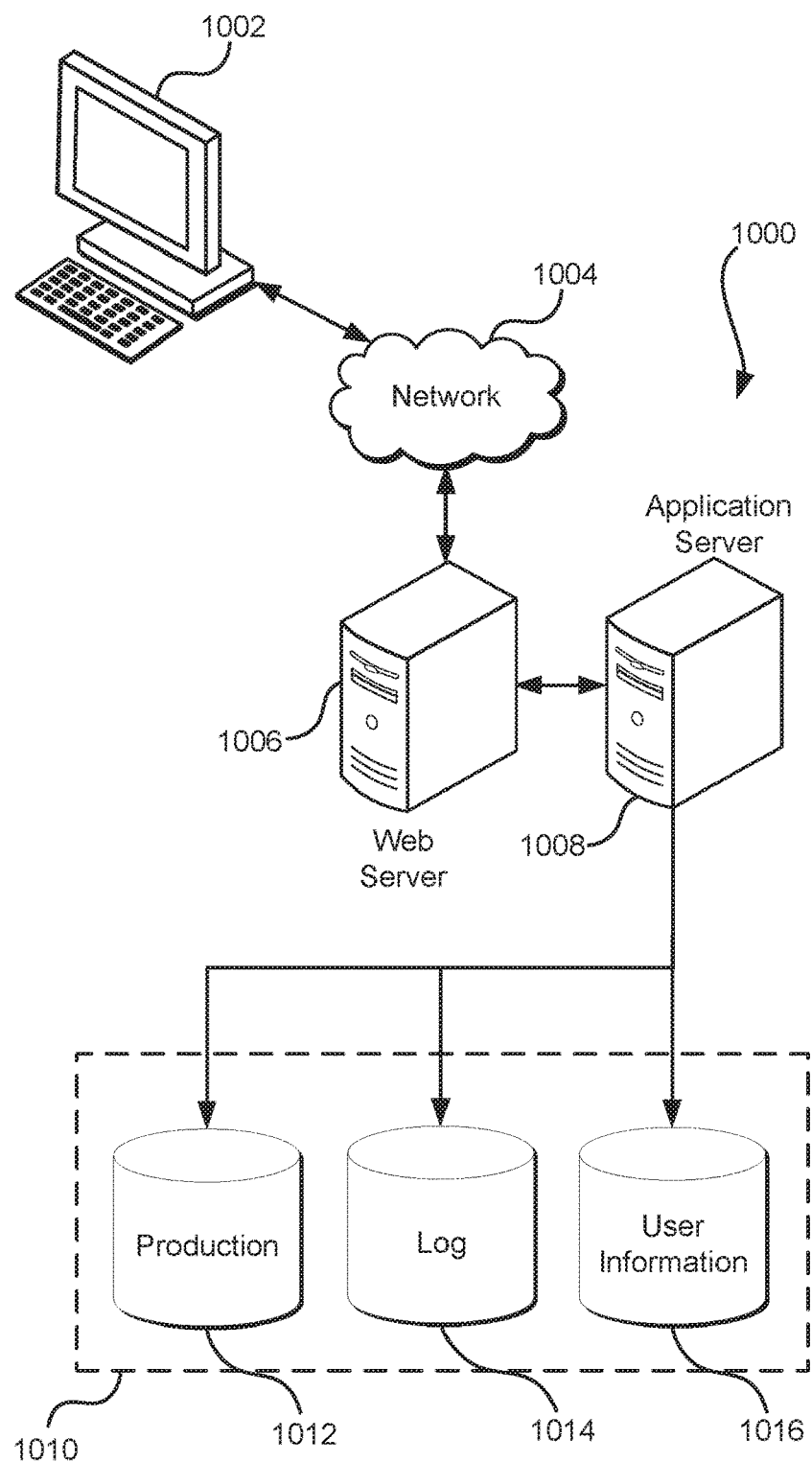
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment.

The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   registering, by a brokerage service in response to a request, a root user device associated with a user as a certificate authority specific to the user for creation of digital certificates, the request including root user device information for identifying the root user device and a first public cryptographic key of a first cryptographic key pair;
   receiving, at the brokerage service from a non-root user device, a digital certificate signing request for the root user device to issue a first digital certificate to a non-root user device associated with the user, the digital certificate signing request including a second public cryptographic key of a second cryptographic key pair and verification data usable by the root user device to verify the digital certificate signing request;
   identifying, based at least in part on the digital certificate signing request, the root user device; and
   transmitting, by the brokerage service, the digital certificate signing request to the root user device to enable the root user device to:
      evaluate the verification data to determine whether the digital certificate signing request is valid;
      as a result of determining that the digital certificate signing request is valid, generate the first digital certificate, the first digital certificate including the second public cryptographic key and a digital signature of the root user device generated using a private cryptographic key of the first cryptographic key pair; and
      issue the first digital certificate to the non-root user device.

2. The computer-implemented method of claim 1, further comprising:
   receiving a second digital certificate signing request, the second digital certificate signing request digitally signed using a private cryptographic key of the second cryptographic key pair; and
   transmitting the second digital certificate signing request to the root user device to enable the root user device to:
      utilize the second public cryptographic key of the second cryptographic key pair to determine whether the second digital certificate signing request is valid;

as a result of determining that the second digital certificate signing request is valid, issue a second digital certificate to the non-root user device; and revoke the first digital certificate.

3. The computer-implemented method of claim 2, wherein transmitting the second digital certificate signing request to the root user device further enables the root user device to transmit the second digital certificate to a certificate brokerage service to issue the second digital certificate to the non-root user device, where the certificate brokerage service:
   stores the second digital certificate in a cache of the certificate brokerage service; and
   transmits a notification to the non-root user device, the notification specifying that the second digital certificate is available for use.

4. The computer-implemented method of claim 1, wherein the method further comprises transmitting the first public cryptographic key to one or more third-party services to enable the one or more third-party services to verify requests that include the digital certificate.

5. A system, comprising at least one computing device that implements one or more services that:
   receive a request from a first user device associated with a user to perform one or more operations, the request including a digital certificate issued by a second user device associated with the user and a digital signature generated using a private cryptographic key of a first cryptographic key pair generated by the first user device;
   obtain, from a brokerage service, a public cryptographic key of a second cryptographic key pair generated by the second user device;
   utilize the public cryptographic key to determine whether the digital certificate can be trusted, the public cryptographic key received by the brokerage service;
   utilize a public cryptographic key of the first cryptographic key pair to determine whether the digital signature is valid; and
   as a result of determining that the digital certificate can be trusted and that the digital signature is valid, fulfill the request.

6. The system of claim 5, wherein:
   the request further includes a second digital certificate that includes the public cryptographic key of the second cryptographic key pair; and
   the one or more services are further configured to access ordering database of digital certificates to determine whether the second digital certificate can be trusted.

7. The system of claim 5, wherein the one or more services further:
   access a database of digital certificates to determine whether the digital certificate has been revoked; and
   as a result of determining, based at least in part on information specified in the database of digital certificates, that the digital certificate has been revoked, deny the request.

8. The system of claim 5, wherein the public cryptographic key of the second cryptographic key pair is provided by a user of the second user device, the user being authorized to provide the public cryptographic key of the second cryptographic key pair.

9. The system of claim 5, wherein the digital certificate issued by the second user device is generated by the second user device in response to a digital certificate signing request from the first user device and as a result of the second user device verifying that verification data included in the digital certificate signing request is valid.

10. The system of claim 9, wherein the public cryptographic key of the first cryptographic key pair is included in the digital certificate signing request to enable the second user device to incorporate the public cryptographic key of the first cryptographic key pair into the digital certificate.

11. The system of claim 5, wherein the one or more services further:
    evaluate a validity period of the digital certificate to determine whether the digital certificate has expired; and
    as a result of determining that the digital certificate has expired, deny the request.

12. The system of claim 5, wherein:
    the request further includes the public cryptographic key of the second cryptographic key pair; and
    the one or more services further:
       transmit a second request to the brokerage service to determine whether the public cryptographic key of the second cryptographic key pair can be trusted, the second request including the public cryptographic key of the second cryptographic key pair;
       receive a response from the brokerage service indicating whether the public cryptographic key of the second cryptographic key pair can be trusted; and
       deny the request if the response indicates that the public cryptographic key of the second cryptographic key pair cannot be trusted.

13. A non-transitory computer-readable storage medium having stored thereon executable instructions that, as a result of being executed by one or more processors of a root user system associated with a user, cause the root user system to at least:
    receive, by the root user system, a request for the root user system to issue a new digital certificate to the non-root user device, the request:
       being forwarded by a certificate brokerage service from a non-root user device associated with the user; and
       including a public cryptographic key of a new cryptographic key pair generated by the non-root user device;
    determine, by the root user system, if the request from the non-root user device is valid using information provided by the user through the non-root user device to the root user system;
    as a result of a determination by the root user system that the request from the non-root user device is valid, utilize the public cryptographic key to generate the new digital certificate;
    utilize a private cryptographic key of a previous cryptographic key pair to digitally sign the new digital certificate; and
    issue the new digital certificate to the non-root user device.

14. The non-transitory computer-readable storage medium of claim 13, wherein:
    the request from the non-root user device includes verification data encrypted using the information provided by the user through the non-root user device to the root user system; and
    the executable instructions further cause the root user system to:
       utilize the information provided by the user through the non-root user device to the root user system to decrypt the verification data; and evaluate the verification data to determine if the request from the non-root user device is valid.

15. The non-transitory computer-readable storage medium of claim 13, wherein:
the new digital certificate is a first new digital certificate;
the public cryptographic key is a first public cryptographic key;
the private cryptographic key is a first private cryptographic key; and
the executable instructions further cause the root user system to:
receive, by the root user system associated with the user, a second request from the non-root user device to issue a second new digital certificate to the non-root user device to replace the first new digital certificate, the second request:
being digitally signed using a second private cryptographic key, the second private cryptographic key being from the second new cryptographic key pair generated by the non-root user device; and
including a second public cryptographic key, the second public cryptographic key being from another cryptographic key pair, the other cryptographic key pair being generated by the non-root user device;
utilizing the first public cryptographic key to determine that the second request is valid;
as a result of determining that the second request is valid, utilize the second public cryptographic key to generate the second new digital certificate;
utilize the first private cryptographic key to digitally sign the second new digital certificate;
issue the second new digital certificate to the non-root user device; and
revoke the first new digital certificate.

16. The non-transitory computer-readable storage medium of claim 15, wherein the executable instructions cause the root user system to revoke the new digital certificate by transmitting a request to the certificate brokerage service to revoke the first digital certificate, whereby the request causes the certificate brokerage service to update a database of digital certificates to indicate that the new digital certificate has been revoked.

17. The non-transitory computer-readable storage medium of claim 13, wherein the request from the non-root user device is provided to the root user system by the certificate brokerage service in response to the certificate brokerage service having received the request from the non-root user device.

18. The non-transitory computer-readable storage medium of claim 13, wherein the executable instructions further cause the root user system to:
receive a notification from the certificate brokerage service indicating that the request from the non-root user device is stored within a device profile of the non-root user device; and
in response to the notification, access the device profile to receive the request from the non-root user device.

19. The non-transitory computer-readable storage medium of claim 13, wherein:
the information provided by the user through the non-root user device to the root user system is a timestamp indicating a time at which the request was generated; and
the executable instructions further cause the root user system to determine whether the timestamp corresponds to a time range during which requests are considered valid such that if the timestamp does not correspond to the time range, the request is denied.

20. The non-transitory computer-readable storage medium of claim 13, wherein the executable instructions further cause the root user system to:
receive a request from the user to generate a code usable as the information provided by the user through the non-root user device to the root user system;
generate the code;
provide the code to the user; and
determine that the request from the non-root user device is valid if the request from the non-root user device includes the code.

* * * * *